United States Patent [19]

McNeil

[11] Patent Number: 5,089,295

[45] Date of Patent: Feb. 18, 1992

[54] SUSPENSION POLYMERIZATION PROCESSES AND TONER COMPOSITIONS THEREOF

[75] Inventor: Daniel M. McNeil, Georgetown, Canada

[73] Assignee: Xerox Corporation, Stamford, Conn.

[21] Appl. No.: 609,859

[22] Filed: Nov. 5, 1990

[51] Int. Cl.[5] ................................................ C08K 3/22
[52] U.S. Cl. ................................... 427/128; 427/222; 524/785; 526/91; 526/230.5; 526/340; 526/340.1; 430/137
[58] Field of Search ............... 526/93, 230.5, 91, 340, 526/340.1; 524/785; 430/137; 427/128, 272

[56] References Cited

U.S. PATENT DOCUMENTS

| Re. 33,172 | 2/1990 | Gruber et al. | 430/39 |
|---|---|---|---|
| 3,634,251 | 1/1972 | Maeda et al. | 252/62.1 |
| 4,170,699 | 10/1979 | Wright | 526/215 |
| 4,231,919 | 11/1980 | Isaacson | 260/42.53 |
| 4,415,644 | 11/1983 | Tamaki | 430/106.6 |
| 4,448,871 | 5/1984 | Tamaki et al. | 430/109 |
| 4,526,726 | 7/1985 | Tang | 260/463 |
| 4,558,108 | 12/1985 | Alexandru | 526/340 |
| 4,560,635 | 12/1985 | Hoffend et al. | 430/106.6 |
| 4,609,607 | 9/1986 | Takagi et al. | 430/106.6 |
| 4,702,988 | 10/1987 | Fukumoto et al. | 430/137 |
| 4,777,230 | 10/1988 | Kamath | 526/86 |

Primary Examiner—Joseph L. Schofer
Assistant Examiner—M. Nagumo
Attorney, Agent, or Firm—E. O. Palazzo

[57] ABSTRACT

Processes for the preparation of polymers which comprises a suspension free radical polymerization of a monomer phase comprised of at least two monomers, and a polymerization initiator; and an aqueous phase comprised of water and magnetite.

59 Claims, No Drawings

SUSPENSION POLYMERIZATION PROCESSES AND TONER COMPOSITIONS THEREOF

BACKGROUND OF THE INVENTION

This invention is generally directed to processes for the preparation of polymers, and more specifically the present invention is directed to suspension polymerization processes for the preparation of polymers and toners thereof. In one embodiment of the present invention, the process comprises the aqueous phase suspension free radical polymerization for the formation of toner polymer resins, such as styrene butadienes, styrene methacrylates, and styrene acrylates, which process avoids the utilization of stabilizers, such as tricalcium phosphate, as compared to prior art processes as illustrated, for example, in U.S. Pat. No. 4,588,108, the disclosure of which is totally incorporated herein by reference. In one embodiment, the process of the present invention relates to the preparation of toner polymers, such as styrene butadiene copolymers, by the suspension polymerization of a monomer phase comprised of monomer or monomers, and initiator with an aqueous phase of water and an iron oxide, including magnetite. In another embodiment, the process of the present invention relates to the preparation of toner polymers, such as styrene butadiene copolymers, by the suspension polymerization of a monomer phase preferably comprised of two or more monomers and initiator with an aqueous phase of water, magnetite, and an inorganic salt like a nitrite, such as sodium or potassium nitrite. Problems solved, and/or advantages associated with the processes of the present invention include, for example, avoiding the use of a stabilizer, such as tricalcium phosphate thereby, for example, eliminating the separation of this stabilizer from the product resin polymer; washing of the polymer product can be avoided; the simplification of toner preparation in that, for example, an iron oxide, such as magnetite, including the known magnetites as illustrated in Reissue U.S. Pat. No. 33,172, the disclosure of which is totally incorporated herein by reference, is added during the process for the preparation of the polymer; and economical processes for the preparation of toner polymers. It is believed that the residual ash remaining from the suspension stabilizer tricalcium phosphate may chemically interact with the charge enhancing additives selected for the toner resulting in an undesirable rapid admix behavior degradation with aging, a disadvantage avoided with the process of the present invention. There are also provided in accordance with the present invention toner compositions comprised of resin particles obtained by the processes illustrated herein, pigment particles, and optional additives, such as waxes with hydroxyl functionality, charge enhancing components, metal salts, metal salts of fatty acids, colloidal silicas and the like. In addition, the present invention is directed to developer compositions comprised of the aforementioned toners, and carrier particles. Furthermore, in another embodiment of the present invention there are provided single component toner compositions comprised of resin particles obtained by the processes illustrated herein, magnetic components such as magnetites, and optional additives such as waxes with hydroxyl functionality. The toner and developer compositions of the present invention are useful, for example, in electrostatographic, especially xerographic, imaging and printing systems, reference for example U.S. Pat. Nos. 4,265,990; 4,298,672; and U.S. Pat. No. 4,560,635, the disclosures of which are totally incorporated herein by reference.

A toner polymer, which has been developed to exhibit properties that can satisfy the stringent standards of advanced copier and duplicators, is a copolymer of styrene and butadiene comprised of, for example, a certain ratio of styrene to butadiene (89/11) moieties, a certain minimum glass transition temperature and a carefully controlled weight average molecular weight ($M_w$) range. Emulsion polymerization is a process that can be selected for the preparation of such polymers. However, emulsion polymerization processes have a number of disadvantages including complicated and difficult to control coagulation operations necessary to separate the solid polymer from the latex produced during the emulsion polymerization process. Further, such polymerization processes result in undesirable residual contaminants. In addition, emulsion polymerization techniques can be relatively costly due to the complex processing steps required to form and separate the polymers. The polymerization of copolymers of styrene and butadiene in, for example, an aqueous medium to form styrene-butadiene copolymer particles is known. Examples of these techniques are illustrated in U.S. Pat. Nos. 2,836,584; 4,169,828 and 4,170,699. Unfortunately, these processes can have attendant disadvantages when selected for the preparation of toner resins. For example, the process of U.S. Pat. No. 2,836,584 utilizes polyvinyl alcohol to prevent the formation of a latex, a redox type polymerization initiator or catalyst, and a long chain mercaptan to control the physical properties of the copolymer. Further, materials containing mercaptans emit hydrogen sulfide into the atmosphere and the sulfurous compounds can be absorbed by paper substrates during flash fusing due to the decomposition of the mercaptan. The odor of hydrogen sulfide in xerographic copies may render such consumer products unacceptable. The polymerization processes described in U.S. Pat. Nos. 4,169,828 and 4,170,699 appear to require the presence of a bisulfite or persulfate modifier in the presence of adjunct modifier such as amino acids or glutamic acid which can adversely affect the electrical properties of electrostatic toners prepared with these materials. The polymerization of at least one polymerizable ethylenic monomer suspended in an aqueous medium often requires the presence of other materials, such as finely divided inorganic particles and additives. For example, the process disclosed in U.S. Pat. No. 2,673,194 to Grim apparently requires the presence of an anionic surface active agent and the process disclosed in U.S. Pat. No. 2,801,921 to Hutchinson et al. is accomplished in the presence of excess alkali and finely divided magnesium hydroxide. Accordingly, there was a need for an improved and more effective aqueous polymerization process for forming a suspension of certain styrene butadiene copolymer particles which may readily be separated from the reaction medium by mere filtration. There also was a need for a polymerization process which would provide toner polymers possessing properties necessary to meet the demanding requirements of modern high speed electrostatographic imaging systems. These and other needs can be provided with the process for the preparation of styrene butadiene copolymers as illustrated in U.S. Pat. No. 4,588,108, the disclosure of which is totally incorporated herein by reference. In one embodiment of the aforementioned patent, there is provided a process for forming discrete particles of a copolymer of styrene and butadiene in which a vapor phase and an aqueous phase comprising a mixture of water, styrene monomer, butadiene monomer, a suspension stabilizing agent, and a chain propagating amount of a free radical polymerization initiator insoluble in water, soluble in the styrene monomer, soluble in the butadiene monomer and having a 1 hour half life between about 50° C. and about 130° C., the ratio of the styrene monomer and the butadiene monomer being between about 80:20 and about 95:5 by weight, the weight proportion of water to the combination of the styrene monomer and the butadiene monomer being between about 0.8:1 and about 2:1, the suspension stabilizing agent consisting essentially of finely divided, difficulty water soluble powder, is heated in an inert atmosphere to a temperature between about 50° C. and about 130° C. at a pressure between about 20 psi and about 140 psi in the absence of redox initiators and mercaptan compounds, removing butadiene monomer from the vapor phase after at least about 75 percent by weight of the butadiene monomer and styrene monomer in the aqueous phase are converted to a copolymer and prior to conversion of more than about 98 percent by weight of the butadiene monomer and styrene monomer in the aqueous phase to a copolymer, and continuing heating in an inert atmosphere at a temperature between about 50° C. and about 130° C. at pressure between about 20 psi and about 140 psi until the Tg value of the discrete copolymer particles formed is between about 45° C. and 65° C. and the weight average molecular weight of the discrete copolymer particles is between about 10,000 and about 400,000. Increased molecular weight distribution of the final copolymer may be achieved by introducing an additional mixture of styrene monomer, butadiene monomer, suspension stabilizing agent and initiator to the aqueous mixture at least once during the heating step. The additional initiator can be added in a different proportion relative to the new charge of monomer compared to the origin aqueous mixture. Optimum yields and minimum residual monomer content are achieved by heating the aqueous mixture with at least two different initiators in accordance with predetermined multistage heating procedures. Any suitable styrene monomer or polymerizable styrene derivative may be employed in the polymerization process of the aforementioned patent according to the teachings thereof. Typical polymerizable styrene derivatives disclosed include alpha-methylstyrene, vinyltoluene, ethylstyrene, monochlorostyrene, dichlorostyrene, alkoxystyrenes, such as paramethoxystyrene, and the like. Styrene is preferred because of its low cost and availability. The other monomeric reactant employed in the process of the above patent is 1,3-butadiene. Also, according to the teachings of this patent any suitable chain propagating amount of a free radical polymerization initiator insoluble in water, soluble in the styrene monomer and soluble in the butadiene monomer may be employed in the process of this invention. Typical monomer soluble free radical polymerization initiators include n-lauryl peroxide, benzoyl peroxide, acetyl peroxide, decanoyl peroxide, azo-bis-isobutyronitrile t-butyl butylperbenzoate, O,O-t-butyl-O-(ethylhexyl)monoperoxycarbonate, peroxydicarbonates 2,2-azo-bis(2,4-dimethyl-1-4-methoxyvaleronitrile), 2,2-azo-bis(2,4-dimethylvaleronitrile), and mixtures thereof. Optimum results can be achieved with peroxides, peroxycarbonates peroxybenzoates, azonitrile free radical polymerization initiators, and the like. These free radical polymerization initiators should possess a half life of about 1 hour at temperatures between about 50° C. and about 130° C. in order to effect adequate polymerization at reaction temperatures between about 50° C. and about 130° C. for reaction times of less than about 8 hours. Satisfactory results may be achieved when the reaction mixture comprises from about 0.05 percent to about 6.5 percent by weight of the free radical polymerization initiator based on a total weight of the styrene monomer and butadiene monomer. A range of about 0.05 percent to about 6 percent by weight of the free radical polymerization initiator may be preferred since it provides an acceptable rate of polymerization and leads to the synthesis of copolymers with molecular properties which enable toners containing these copolymers to melt at low temperatures. Too high a concentration may result in a low molecular weight. Reaction time can be excessive when the concentration of initiator is less than about 0.05 percent. Moreover, the suspension may become unstable and result in polymers having a high molecular weight when the initiator concentration is low.

Disadvantages associated with the process of the aforementioned '108 patent can include long reaction times, for example the reaction time from initiation to completion can be 362 minutes, which includes 45 minutes to heat the reactor to 95° C. from ambient temperature, 192 minutes for the reaction to proceed at 95° C., 40 minutes for the reaction temperature to be increased from 95° C. to 125° C., 60 minutes for the reaction to proceed at 125° C. and 25 minutes for the reactor to be cooled to ambient temperature. Also, with the process of the '108 patent stabilizers such as tricalcium phosphate are selected. These and other disadvantages can be avoided or minimized with the process of the present invention wherein the use of a nontoner component stabilizer such as tricalcium phosphate can be eliminated, and there can, for example, be selected as the free radical polymerization initiator Lupersol TEAC, O,O-t-amyl-O-(2-ethyl-hexyl)monoperoxide carbonate. More specifically, with the aforementioned Lupersol, available from Lucidol Division of Pennwalt Corporation, the reaction time of the process as illustrated in the '108 patent can be reduced at least by, for example, one hour, reference copending application U.S. Ser. No. 548,328, the disclosure of which is totally incorporated herein by reference, thereby enabling, for example, the reaction to be completed in 302 minutes rather than 362 minutes in an embodiment. Also, 33 minutes can be reduced from the part of the reaction where the monomers react at 95° C., and 27 minutes can be reduced from the portion of the reaction where the monomers react at 125° C. in embodiments disclosed in the copending application. With the processes of the present invention, the stabilizer is replaced with a component that is normally added to the resin in the manufacturing of toner, thus the disadvantages mentioned herein can be avoided or minimized. In place of the stabilizer, there can be selected in accordance with process embodiments of the present invention inorganic oxides, such as magnetites, including magnetites available from Columbian Chemicals, and preferably Mapico Black, which oxides also function as a pigment. Advantages thereof include, for example, the elimination of acid washing of the polymer resin, and elimination of the subsequent stabilizer recovery, disposal and acid neutralization steps. Another advantage is simplified toner processing because of the addition of toner component(s) during the resin production step.

Moreover, toner and developer compositions, especially those containing charge enhancing additives, especially additives which impart a positive charge to the toner resin, are well known. Thus, for example, there is described in U.S. Pat. No. 3,893,935 the use of certain quaternary ammonium salts as charge control agents for electrostatic toner compositions. There is also described in U.S. Pat. No. 2,986,521 reversal developer compositions comprised of toner resin particles coated with finely divided colloidal silica. According to the disclosure of this patent, the development of images on negatively charged surfaces is accomplished by applying a developer composition having a positively charged triboelectric relationship with respect to the colloidal silica. Further, there are illustrated in U.S. Pat. No. 4,338,390, the disclosure of which is totally incorporated herein by reference, developer and toner compositions with charge enhancing additives, organic sulfate and sulfonate compositions; and in U.S. Pat. No. 4,298,672, the disclosure of which is totally incorporated herein by reference, toners with alkylpyridinium halides.

The following prior art, all U.S. patents, are mentioned: U.S. Pat. No. 4,777,230 relating to free radical polymerization of certain monomers, and wherein according to the Abstract of the Disclosure these polymers are produced by a solution polymerization with an initiating amount of tertiary alkyl hydroperoxide or its derivatives, such as monoperoxy carbonates, see column 2 for example; note column 7 wherein the initiator can be O,O-t-amyl-O-(2-ethylhexyl)monoperoxy carbonate, and in column 8 wherein the initiator can be Lupersol® TAEC, O,O-t-amyl-O-(2-ethylhexyl)-monoperoxy carbonate, marketed by the Lucidol Division of Pennwalt Corporation; column 9, Lupersol® TAEC, and, for example, columns 13 and 14; U.S. Pat. No. 3,326,859 which discloses a polymerization method with peroxycarbonates, see for example column 2; U.S. Pat. No. 4,277,592, see column 3 wherein as an initiator there is selected bis(2-ethyl-hexyl)percarbonate; U.S. Pat. No. 4,526,726, see column 3 for example; U.S. Pat. No. 4,613,656, see the Abstract of the Disclosure for example; and as background interest Reissue 25,763; U.S. Pat. Nos. 2,370,588; 2,475,648 and 2,839,519.

SUMMARY OF THE INVENTION

It is a feature of the present invention to provide processes for the preparation of polymers.

Another feature of the present invention resides in the provision of processes for the preparation of styrene butadiene copolymers, which processes have many of the advantages illustrated herein.

Further, in another feature of the present invention there are provided economical processes for the preparation of styrene butadiene polymers.

Also, in another feature of the present invention there are provided economical processes for the preparation of styrene methacrylate, such as styrene butyl methacrylate and styrene acrylate polymers.

Additionally, in another feature of the present invention there are provided suspension polymerization processes for the preparation of styrene butadiene polymers wherein there is avoided the use of stabilizers, such as tricalcium phosphates, as compared to the prior art process as illustrated, for example, in U.S. Pat. No. 4,588,108 wherein such stabilizers are utilized.

Another feature of the present invention resides in the provision of suspension polymerization processes wherein there is reacted a monomer phase comprised of monomers, and initiators with an aqueous phase comprised of water, an inorganic oxide stabilizer, and as an optional component Alkanol® available from E. I. DuPont.

Another feature of the present invention resides in the provision of suspension polymerization processes wherein there is reacted a monomer phase comprised of monomers, and initiators with an aqueous phase comprised of water, an inorganic oxide stabilizer, an inorganic salt, such as an alkali nitrite, including sodium nitrite, and as an optional component Alkanol®.

Another feature of the present invention resides in the provision of suspension polymerization processes wherein there is reacted a monomer phase comprised of monomers, and initiators with an aqueous phase comprised of water, an iron oxide stabilizer, such as a magnetite, an inorganic salt, such as an alkali nitrite, including sodium nitrite, and as an optional component Alkanol®.

Moreover, in another feature of the present invention there are provided toner compositions comprised of the polymers obtained with the process of the present invention.

Further, in another feature of the present invention there are provided processes for the preparation of styrene/butadiene copolymers that contain small amounts of residual monomers (less than 10 ppm for butadiene and less than 1,400 ppm for styrene) in embodiments of the present invention.

In another feature of the present invention, there are provided processes for the preparation of styrene/butadiene copolymers whose number average molecular weights are from about 10,000 to about 400,000, and more specifically about 130,000 enabling, for example, the toner polymer resin to possess excellent sufficient mechanical strength and excellent flow properties (Melt Index numbers between about 18 to about 30 grams/10 minutes when measured at 150° C. with a 2.1 killograms weight).

In another feature of the present invention, there are provided processes for the preparation of toner polymers wherein suspension failure is avoided, or minimized.

In another feature of the present invention there are provided processes for the preparation of toner polymers wherein reactor fouling is avoided, or minimized.

Another feature of the present invention relates to the preparation of toner polymers by suspension polymerization wherein there is added to the aqueous phase an inorganic salt, such as nitrites, chlorides, phosphates, nitrates, and the like, thereby providing, it is believed, control of the absorption of the inorganic oxide stabilizer into the polymer.

In yet another feature of the present invention, there is provided a process for the preparation of toner polymers wherein there is selected as the stabilizer in place of, for example, tricalcium phosphate, iron oxides, especially magnetites like Mapico Black.

Further, in another feature of the present invention there is provided a process for the preparation of toner polymers wherein Alkanol® surfactant and stabilizer, such as tricalcium phosphate (TCP), can be replaced with iron oxides, especially magnetites like Mapico Black.

In yet another feature of the present invention, there is provided a process for the preparation of toner polymers wherein there is selected as the stabilizer in place of, for example, tricalcium phosphate, polyvinylalcohol, and the like, iron oxides, especially magnetites like Mapico Black, and wherein there can be provided controlled adsorption of the stabilizer into, and/or on the polymer surface. The stabilizer can be present as a continuous coating on the polymer, or less preferably as a semicontinuous coating in embodiments. Also, there can be minimized, if desired, the known prior art washing with, for example, water to remove any undesirable water soluble aqueous phase additives, such as Alkanol ®, and the use of an acid, such as nitric acid, can be avoided with the processes of the present invention. Moreover, with the processes of the present invention in embodiments thereof the down stream addition of iron oxide, like Mapico Black, which is functioning as a pigment and as a stabilizer, can be avoided in that such a material is added during the process as indicated herein. The specific gravity of the coated polymer with magnetite obtained with a process embodiment of the present invention can be higher than the specific gravity of polymers prepared by known methods. Further, the stabilizer selected for the process of the present invention is not substantially removed subsequent to reaction completion in that the stabilizer also functions as a pigment.

Another feature of the present invention resides in the preparation of toner polymers wherein there can be selected as stabilizers in place of the magnetites mentioned herein, colored pigments, such as cyan, yellow, magenta, red, green, blue, brown, and the like, thereby enabling, for example, colored stabilized toners with a polymer containing a pigment-stabilizer coating.

Yet another feature of the present invention relates to in situ processes for the preparation of toner compositions.

Yet another feature of the present invention relates to dispersion polymerized toner (DTP) processes.

These and other features of the present invention can be accomplished by providing processes for the preparation of polymers. More specifically, the present invention is directed to suspension free radical polymerization processes for the preparation of polymer, such as styrene butadiene toner polymers. In another embodiment of the present invention, there are provided toner compositions comprised of the resin (polymer) particles obtained with the processes illustrated herein, pigment particles, and optional additive components.

Process embodiments of the present invention include processes for the preparation of polymers, which comprise a suspension free radical polymerization of a monomer phase comprised of at least two monomers and a polymerization initiator, and an aqueous phase comprised of water and magnetite; processes for the preparation of polymers, which comprise a suspension free radical polymerization of a monomer phase comprised of at least two monomers and a polymerization initiator, and an aqueous phase comprised of water, magnetite, and a alkali metal nitrite; a process for the preparation of polymers, which comprises a suspension free radical polymerization of a monomer phase comprised of styrene and butadiene and a polymerization initiator, and an aqueous phase comprised of water and magnetite; a process for the preparation of polymers, which comprises a suspension free radical polymerization of a monomer phase comprised of styrene and butadiene and a polymerization initiator, and an aqueous phase comprised of water, magnetite, and an alkali metal nitrite; a process for the preparation of polymers, which comprises a suspension free radical polymerization of a monomer phase comprised of a copolymer of styrene and n-butyl methacrylate, preferably 58/11, and a polymerization initiator, and an aqueous phase comprised of water, magnetite, and an alkali metal nitrite; processes for the preparation of polymers, which comprise a suspension free radical polymerization of a monomer phase comprised of at least two monomers and a polymerization initiator; and an aqueous phase comprised of water, magnetite, alkanol, and an alkali metal nitrite; a process for the preparation of polymers, which comprises a suspension free radical polymerization of a monomer phase comprised of styrene and butadiene, and a polymerization initiator, and an aqueous phase comprised of water and magnetite, which functions as a pigment and a stabilizer; a process for preparing styrene butadiene copolymers, which comprises mixing styrene monomer, butadiene monomer, first and second initiators; adding the mixture formed to an aqueous phase comprised of water and a surfactant; heating the resulting mixture for a period of from about 1 minute to about 2 hours at a temperature of from about 50° C. to about 110° C. to accomplish partial polymerization; thereafter adding thereto an additional aqueous phase comprised of water and magnetite, and subsequently continuing the polymerization for a period of from about 1 hour to about 15 hours; heating the resulting mixture at a temperature of from about 110° C. to about 150° C., and cooling the mixture; subsequently isolating the resulting styrene butadiene copolymer with a weight average molecular weight of between about 10,000 and 500,000, a molecular weight distribution of between about 2 and about 9, a Tg of between about 45° C. and about 75° C., the ratio of the styrene monomer and the butadiene monomer being between about 80:20 and about 95:5 by weight; and a process for generating a copolymer of styrene and butadiene comprising providing an aqueous phase comprising water, magnetite, and surfactant and reacting with a monomer phase of styrene, butadiene and initiators, wherein the ratio of styrene monomer and butadiene monomer is being between about 80:20 and about 95:5 by weight, the weight proportion of water to the combination of the styrene monomer and the butadiene monomer is between about 0.8:1 and about 2:1, heating the aqueous phase and the formed vapor phase to a temperature between about 50° C. and about 130° C. at a pressure between about 20 psi and about 140 psi in the absence of redox initiators and mercaptan compounds, removing butadiene monomer from the formed vapor phase after at least about 75 percent by weight of the butadiene monomer and the styrene monomer are converted to a copolymer and prior to conversion of more than about 98 percent by weight of the butadiene monomer and the styrene monomer to a copolymer, and heating at a temperature between about 100° C. and about 130° C. at a pressure between about 20 psi and about 140 psi until at least about 90 percent by weight of the styrene monomer and the butadiene monomer are copolymerized to form an aqueous suspension of discrete copolymer particles having a Tg value of between about 45° C. and about 65° C., a weight average molecular weight of between about 10,000 and about 400,000, a molecular weight distribution of the copolymer being between about 2 and about 9, and a butadiene monomer concentration of less than about 10 parts per million by weight.

In one embodiment of the present invention, there is provided a suspension polymerization process for the preparation of polymers, which comprises the reaction of a monomer phase comprised of at least two monomers, such as styrene and butadiene, and known initiators, such as benzoyl peroxide, with an aqueous phase comprised of water, an inorganic oxide pigment, such as magnetite, which is believed to also function as a stabilizer, and as an optional component Alkanol ® (sodium alkyl naphthalene sulfonate wherein alkyl is isopropyl, it is believed). This process embodiment comprises, for example, forming an aqueous phase comprised of from about 70 percent to about 99 percent of water, from about 1 percent to about 35 percent of inorganic oxide such as black magnetite ($FeO.Fe_2O_3$) or red magnetite ($Fe_2O_3$), and optionally a surfactant such as sodium alkyl naphthalene sulfonate at a concentration level of 0 to about 1,000 ppm in the water. A preferred concentration range of the inorganic oxide is between about 8 percent and about 25 percent by weight of the aqueous phase. Subsequently, there is added to the agitated aqueous phase a monomer phase comprised of at least two monomers, such as, for example, styrene and butadiene, premixed with one or two initiators, such as, for example, benzoyl peroxide and TBEC (O,O-t-butyl-O-(2-ethylhexyl)monoperoxy-carbonate). The ratio of said aqueous phase to said monomer phase is between from about 0.6:1 to about 3:1 with a preferred range of from about 0.8:1 to 1:1. A suspension of monomer droplets stabilized by the inorganic oxide is formed upon addition of the monomer phase to the agitated aqueous phase. Polymerization is initiated by heating at an effective temperature of, for example, from about 50° C. to 110° C. at a pressure from about 20 psi to about 140 psi, continued for a period of from about 1 hour to about 15 hours, and then heated to a temperature of from about 110° C. to about 150° C. for between about 30 minutes to about 3 hours. The resulting mixture is then cooled to between about 20° C. and about 75° C. The polymer particles obtained are separated from the aqueous phase by, for example, filtration or centrifugation, optionally washed with water to remove, for example, any surfactant such as Alkanol ® if utilized, and then dried.

In another embodiment of the present invention, there are provided suspension polymerization processes for the preparation of polymers which comprises the reaction of a monomer phase comprised of at least two monomers, such as styrene and butadiene, and initiators, such as benzoyl peroxide, with an aqueous phase comprised of water, an inorganic oxide, such as magnetite, which is believed to also function as a stabilizer, an inorganic salt such as sodium nitrite, and as an optional component Alkanol ® (sodium alkyl, especially isopropyl naphthalene sulfonate). More specifically, this process embodiment comprises forming an aqueous phase, subsequently heated to from about 50° C. to 110° C., comprised of about 70 percent to about 99 percent of water, from about 1 percent to about 35 percent of inorganic oxide, such as black magnetite ($FeO.Fe_2O_3$) or red magnetite ($Fe_2O_3$), sodium nitrite in a concentration of from about 500 ppm to about 1,500 ppm and optionally a surfactant, such as sodium isopropyl naphthalene sulfonate, at a concentration level of 0 to 1,000 ppm in the water. The preferred concentration range of the inorganic oxide is between about 8 percent and 25 percent by weight of the aqueous phase. There can then be added to the agitated aqueous phase a monomer phase comprised of at least two monomers, such as, for example, styrene and butadiene, premixed with one or two initiators, such as, for example, benzoyl peroxide and TBEC (O,O-t-butyl-O(2-ethylhexyl)monoperoxy carbonate). The ratio of the aqueous phase to the monomer phase is, for example, between from about 0.6:1 to about 3:1 with a preferred range of from about 0.8:1 to about 1:1. A suspension of monomer droplets stabilized by the inorganic oxide is formed upon addition of the monomer phase to the agitated aqueous phase. Polymerization can be initiated at an effective temperature of, for example, from about 50° C. to about 110° C. at a pressure of from about 20 psi to about 140 psi, continued for between about 1 hour and about 15 hours, and then heated to a temperature of from about 110° C. to about 150° C. for between about 30 minutes and about 3 hours. The mixture is then cooled to between about 20° C. and about 75° C. The polymer particles obtained are separated from the aqueous phase by, for example, filtration or centrifugation, optionally washed with water to remove, for example, any remaining sodium nitrite or surfactant, and then dried.

One specific embodiment of the present invention is directed to a suspension polymerization process for forming copolymers of, for example, styrene and butadiene by reaction of a monomer phase comprised of at least two monomers, such as styrene and butadiene, and an initiator, such as benzoyl peroxide, TBEC, or mixtures thereof, and the like with an aqueous phase comprised of water, an inorganic oxide, such as magnetite, which is believed to function as a stabilizer and pigment, an optional inorganic salt, such as sodium nitrite, and as another optional component a surfactant, such as Alkanol ®. In this reaction, there can be selected a chain propagating amount of the free radical polymerization initiator, such as benzoyl peroxide, whose 1 hour half life is 91° C. and initiators, such as O,O-t-amyl-O-(2-ethylhexyl)monoperoxy carbonate, available as Lupersol ® TAEC from Lucidol Division of Pennwalt Corporation, or those illustrated in the '188 patent, whose 1 hour half life is 117° C., which initiators are insoluble in water, soluble in the styrene monomer, soluble in the butadiene monomer, and the ratio of the styrene monomer and the butadiene monomer being between about 80:20 and about 95:5 by weight, the weight proportion of water to the combination of the styrene monomer and the butadiene monomer being between about 0.8:1 and about 2:1, the suspension stabilizing inorganic oxide agent being comprised of a finely divided, difficulty water soluble powder and a vapor phase comprised of an inert gas and butadiene monomer, heating the aqueous phase and the vapor phase to a temperature between about 50° C. and about 110° C. at a pressure between about 20 psi and about 140 psi in the absence of redox initiators and mercaptan compounds, removing butadiene monomer from the vapor phase after at least about 75 percent by weight of the butadiene monomer and the styrene monomer in the aqueous phase are converted to a copolymer and prior to conversion of more than about 98 percent by weight of the butadiene monomer and the styrene monomer to a copolymer in the aqueous phase, and heating the aqueous phase at a temperature between about 110° C. and about 130° C. at a pressure between about 20 psi and about 140 psi until at least about 95 percent by weight of the styrene monomer and the butadiene monomer are copolymerized to form an aqueous suspension of discrete copolymer particles having a Tg value of between about 45° C. and about 65° C., a weight average molecular weight of between about 10,000 and about 400,000, a molecular weight distribution of the copolymer being between about 2 and about 9, and a butadiene monomer concentration of less than about 10 parts per million by weight. With the aforementioned process, the heating of said aqueous phase is usually from about 200 to about 350 minutes and preferably for about 295 minutes.

In one embodiment of the present invention, the process comprises forming an aqueous phase by mixing a magnetite, such as Mapico Black in a solution of Alkanol ® in deionized water. The weight of magnetite in the aqueous phase is between about 8 percent and 20 percent of the weight of water and the concentration of Alkanol ® dissolved in the water is between 100 ppm and about 400 ppm. The resulting mixture can then be added to a Parr pressure reactor that has been modified to allow it to be connected to a 300 milliliter bomb. The reactor is sealed and stirring is initiated with a mechanical stirrer, and continued throughout the course of the reaction. The resulting mixture can then be heated with a heating mantel to 95° C. while the reactor is flushed with an inert gas such as nitrogen. When the temperature of the reaction mixture has reached 95° C., a monomer phase comprised of a solution of 12.3 percent of butadiene, 83.9 percent of styrene, 3.4 percent of benzoyl peroxide, and 0.4 percent of the high temperature initiator, such as TBEC (O,O-t-butyl-O(2-ethylhexyl)-monoperoxy-carbonate) is added, via a sparge tube, under a pressure of from about 80 psi to about 120 psi of nitrogen gas. The reaction can be allowed to proceed for between 120 minutes and 200 minutes, after which the reactor can be vented and the reaction temperature raised to a temperature of from about 115° C. to about 130° C., maintained at that temperature for between 30 minutes and 90 minutes and then air cooled to ambient temperature, about 25° C. The product, such as styrene butadiene, resulting can then be filtered in a filter funnel, optionally washed several times with about 500 milliliters of water, and dried in a vacuum tray drier.

The magnetite or similar stablizer-pigment is usually embedded in the polymer, and is present preferably as a continuous coating thereover of various effective thicknesses as, for example, illustrated herein.

Illustrative examples of monomer or comonomers selected for the processes of the present invention and present in effective amounts of, for example, from about 1 percent to 99 percent by weight of monomer as illustrated herein include vinyl monomers, such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids with a double bond and their derivatives such as maleic acid, monobutyl maleate, dibutyl maleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated monoolefins such as isobutylene and the like; vinylidene halides such as vinylidene chloride and the like; N-vinyl compounds such as N-vinyl pyrrole and the like; butadiene and isoprene monomers; and mixtures thereof. In one embodiment, there is selected a monomer of styrene and a monomer of butadiene to enable, for example, a styrene butadiene copolymer with from about 75 to about 95 percent by weight of styrene. The preferred ratio of the styrene monomer to butadiene monomer reactant is between about 80 to 20 and about 95 to 5 by weight. Excessively low ratios of styrene monomer tend to cause a decrease of the Tg which can lead to unacceptably low toner resin blocking temperatures and agglomeration of toner particles obtained from such resins. Unduly high ratios of styrene monomer may result in copolymers with high softening temperatures and result in toners requiring high fixing temperatures and high fixing energy.

Generally, examples of known toner polymers obtained with the process of the present invention include styrene acrylates, styrene methacrylates, especially styrene-butyl methacrylates, and styrene butadienes, preferably with, for example, about 88 percent to about 92 percent by weight of styrene and from about 12 to about 8 percent of butadiene.

Examples of stabilizer-pigments include a number of known materials such as iron oxides, such as magnetites, inclusive of Mapico Black, and the like as illustrated herein. Also, there can be selected as stabilizer-pigment materials colored, excluding black, components as illustrated herein for the toner, such as cyan, magenta, yellow, red, blue, green, and the like. Polymerization initiators, surfactants, and alkali metal salts are known, and include those as illustrated herein such as the initiators of the '108 patent and the copending application; Alkanol ® surfactants (a sodium alkyl, especially, it is believed, isopropyl, naphthalene sulfonate, available from E. I. duPont de Nemours & Company); and sodium or potassium nitrite, and the like, all utilized in various effective amounts. Other typical known ionic surfactants include sodium oleate, dodecylbenzene sodium sulfonate, sodium tetradecyl sulfate and the like. The ionic surfactant can be present in an amount of, for example, from about 0.2 percent to about 4 percent by weight based on the total weight of the suspension stabilizing agent. The amount of water employed in the polymerization process of the present invention may be varied, however, for reasons of heat transfer and monomer and polymer processing, a water to combined styrene monomer and butadiene monomer weight proportion is preferably between about 0.8:1 and about 2:1. When the amount of water is less than about 0.8:1, it may become difficult to avoid agglomeration of the suspended copolymer particles under reaction conditions. When more than a 2:1 ratio is utilized, the low yield of copolymer tends to become commercially unattractive. The reaction can be conducted in an inert atmosphere such as nitrogen, argon and the like.

The known suspension stabilizing agents, such as TCP, are not utilized in the process of the present invention. These known suspension stabilizing agents include a finely divided, difficult water soluble powder, such as tricalcium phosphate (TCP), barium phosphate, zinc phosphate magnesium phosphate, bentonite, talc and the like. The amount of known suspension stabilizing agent that may be used in prior art processes can be from about 0.05 percent to about 5.0 percent by weight, based on total weight of the styrene monomer and butadiene monomer. The amount of suspension stabilizing agent of from about 0.05 percent to about 5.0 percent is preferred since it usually assures a stable suspension of copolymer particles. An ionic surfactant, which may be utilized to disperse the suspension stabilizing agent, includes sodium alkyl naphthalene sulfonate, a surfactant that can be selected as an optional component for the processes of the present invention (Alkanol ® XC, available from E. I. duPont de Nemours & Company), which aids the suspension stabilizing agents to more effectively stabilize the suspension.

The polymerization reaction of the present invention can be accomplished in an embodiment in a closed system to avoid loss of gaseous butadiene and preferably at a pressure of between about 20 psi and about 140 psi, and more preferably between about 40 psi and about 100 psi to drive the monomers into the reactor against the back pressure of flashed butadiene. Although useful lower pressures may be insufficient to force the monomers into the reactor and higher pressures could require specially designed and expensive reactors. The pressurized polymerization system can comprise a vapor phase, containing butadiene monomer and an inert gas and an aqueous phase containing water, styrene monomer, butadiene monomer, the suspension stabilizing-pigment component, and one or more chain propagating free radical polymerization initiators.

Stirring of the reaction mixture during heating is highly desirable to, for example, avoid agglomeration of the suspended copolymer particles and to disperse the heat of reaction. Any suitable known conventional techniques may be utilized. Typical agitation systems include mechanical stirring blades, magnetic mixers, ultrasonic agitators, and the like. It is believed that due to the explosive hazard presented by butadiene, air motors or explosion proof electric motors be utilized for driving the mechanical stirrers.

The polymerization temperature will be dependent to some extent upon the half life of the free radical polymerization initiator and the weight ratio of water to monomer utilized. Generally, a temperature between about 50° C. and about 130° C. is satisfactory. Temperatures lower than about 50° C. may require undesirable long reaction times. Temperatures above about 130° C. may affect the macromolecular structure and the molecular properties of the product. During the venting procedure, butadiene monomer removal from the vapor phase should be accomplished as rapidly as possible to limit loss of butadiene by diffusion out of the polymer particles into the vapor. Though this diffusion is a relatively slow process and thus speed is not particularly critical, except for overall reactor productivity, removal of butadiene can be accomplished after the bulk of the polymerization has occurred, thus avoiding the waste of butadiene or adversely affecting the properties of the resulting polymer. Under typical operating conditions, this is accomplished in about 2 to 3 hours into the reaction. This provides sufficient time for the butadiene still dissolved in the polymer to react (for example, about 30 to 45 minutes at a high temperature of, for example, about 125° C.). While the butadiene can be removed at any temperature, it is more convenient to do so below the boiling point of water. Thus, for example, the butadiene vapor is typically vented at about between 90° to 95° C. before raising the reactor temperature to about 125° C. Removal of the butadiene vapor from the vapor phase may be effected by any suitable technique. For example, the butadiene vapor may be removed by venting, continuous flushing with an inert gas, recycling the reactor vapor space through an appropriate butadiene scrubber, and the like. Venting is preferred because it is simple, rapid, inexpensive and efficient. When venting is employed in removing butadiene monomer from the vapor phase, the venting step should be repeated at least twice to ensure adequate removal of butadiene monomer vapor. A venting procedure involves the following steps. A valve is opened and the pressure in the vapor phase region of the reactor is released at a rate convenient for the reactor and piping size. Following depressurization, the valve is closed and the reactor repressurized with an inert gas. This pressure resulting from repressurization is then released and the aforementioned process may then be repeated. The butadiene vapor is, in effect, diluted out by repeated purges of inert gas. The reactor pressure need not be reduced to atmospheric pressure so long as the venting process eventually removes substantially all the butadiene monomer vapor from the vapor phase in the reactor. Reduction of the reactor pressure to atmospheric pressure should be avoided when the reactor is at a temperature above 100° C. to avoid excessive loss of water. Preferably, sufficient butadiene monomer vapor is removed from the vapor phase in the reaction system to reduce the butadiene monomer vapor concentration in the vapor phase of from about 11 percent by volume to less than about 0.05 percent by volume. This ensures satisfactory achievement of a butadiene monomer concentration in the copolymer particles of less than about 10 parts per million by weight during the polymerization reaction. Preferably, the butadiene monomer concentration in the copolymer particles are reduced to less than about 1 part per million by weight. A low concentration of butadiene monomer in the copolymer particle product is especially desirable to minimize adverse effects on blocking and electrical properties of electrostatographic toners and to obviate health and odor concerns.

It has also been found in process embodiments of the present invention that significant reduction of the residual styrene monomer in the final reaction product may be achieved by heating the aqueous mixture in accordance with a predetermined heating profile involving heating the aqueous mixture to a first temperature between about 50° C. and less than about 100° C., maintaining the first temperature until substantial thermolitic dissociation of at least one free radical polymerization initiator occurs and thereafter raising the temperature of the aqueous reaction mixture to at least a second temperature greater than about 90° C. and less than about 130° C., and maintaining the second temperature for a sufficient period of time to achieve substantial thermolitic dissociation of a second free radical polymerization initiator. Substantial thermolitic dissociation refers to, for example, that at least about 50 percent based on the initial charge of the free radical polymerization initiator actually dissociates.

A significant reduction of the residual butadiene monomer in the final reaction product may be achieved by removing substantially all the butadiene monomer still present in the vapor phase after at least about 75 percent by weight of the butadiene monomer and styrene monomer in the aqueous phase are converted to a copolymer and prior to more than about 98 percent by weight of the butadiene monomer and styrene monomer in the aqueous phase are converted to a copolymer thereby allowing the butadiene monomer present in the copolymer particles suspended in the aqueous phase to copolymerize with the styrene coreactant. In suspension polymerization systems, the butadiene is partitioned between the polymerizable particles and the vapor phase. It is believed that a dynamic pressure equilibrium controls the partition. As butadiene in the particles copolymerizes with styrene, fresh quantities of butadiene from the vapor phase enter the particles. The pressure in the suspension polymerization system decreases and polymerization conversion is monitored by continuous or periodic recording. Since the pressure in the suspension polymerization system continues to decrease to the end of the polymerization and since butadiene is still found in the final vent, it is believed that fresh butadiene from the vapor phase continues to penetrate into the particles to the end of the polymerization process. Therefore, that part of the butadiene which penetrates the particles only in the final stage of the reaction is not allotted sufficient time to polymerize and remains trapped as a residue in the resin. This appears to be the source of the residual butadiene in the final copolymer resin product. Thus, removal of substantially all the butadiene monomer vapor still present in the vapor phase after the copolymer particles from, but prior to termination of the polymerization process allows the butadiene monomer present in the copolymer particles in the aqueous phase to copolymerize with the styrene coreactant.

The butadiene vapor can be removed from the vapor phase after at least about 75 percent by weight of the butadiene monomer and styrene monomer in the monomer phase are converted to a copolymer and prior to more than about 98 percent by weight of the butadiene monomer and styrene monomer in the monomer phase are converted to a copolymer to allow the butadiene monomer to copolymerize with the styrene coreactant after removal of the butadiene monomer from the vapor phase and prior to termination of the reaction. Preferably, the butadiene monomer is removed from the vapor phase after at least about 85 percent by weight of the butadiene monomer and styrene monomer are converted to a copolymer and prior to more than about 95 percent by weight of the butadiene monomer and polymers and the primary initiator level can indirectly affect the residual monomer level. A styrene and butadiene copolymer weight average molecular weight between about 10,000 and about 400,000 can be selected for ideal toner resin properties in high speed electrostatographic copiers and duplicators.

Suitable profiles for the multistage heating profile embodiment of this invention may be determined by considering the half life characteristics of the initiators. The lower temperature region should be sufficiently long to polymerize the bulk of the monomer both for energy efficiency and suspension stability. The time for the upper temperature reaction is chosen to be as short as possible while achieving the desired reduction in residual monomer content of the final product and controlling the final $M_w$. Thus, the desired temperature profile may be readily determined by conducting time-temperature reactions and measurement of the polymer properties. Another variable is the length of time devoted moving from one temperature to another (the ramp) and this is generally kept as short as possible for the reactor system with a time allowance for the remaining first stage initiator to decompose in a nonexplosive fashion.

The multistage heating profile embodiment of this invention has been found to be capable of reducing the residual styrene monomer in the final resin product to as low as about 0.05 percent by weight based on the total weight of the copolymer product and the residual butadiene monomer content to as low as about 17 ppm by weight based on the total weight of the copolymer product. Residual monomer content in the final copolymer product can be minimized to avoid a reduction of the blocking temperature and perhaps undesirable environmental effects produced when the resin is subjected to fusing conditions in some electrostatographic copiers and duplicators. Generally, for multistage heating profiles, it is desirable that between about 70 percent and about 95 percent by weight of the total monomer mixture be polymerized in the first heating stage to about the molecular weight desired and thereafter heated to one or more subsequent stages to polymerize the residual monomer remaining in the composition. The multistage heating profile permits the use of smaller amounts of active free radical polymerization initiators in the one or more heating stages following the first heating stage. It is believed that the one or more subsequent heating stages promotes more effective diffusion of the initiator to the monomers for more complete polymerization. It is further believed that O,O-t-amyl-O-(2-ethylhexyl)-monoperoxycarbonate is more efficient at polymerizing residual monomer than O,O-t-butyl-O-(2-ethylhexyl)-monoperoxycarbonate in embodiments of the present invention. The multistage heating profile embodiment also provides optimum molecular weight distribution. Molecular weight distribution (MWD) is defined as the ratio between the weight average molecular weight ($M_w$) and the number average molecular weight ($M_n$).

Although the process specifics of the present invention have been illustrated primarily with respect to styrene butadiene, similar or equivalent parameters and specifics can, it is believed, be utilized for the preparation of other known toner polymer products, such as styrene acrylates, styrene methacrylates, and the like.

Toner compositions can be formed by adding to the product obtained with the process of the present invention components, such as charge additives optional, additional pigment such as magnetite, carbon black, and the like. With the process of the present invention in an embodiment thereof, the magnetite or other pigment, which also functions as a stabilizer, is part of the final product and need not be added in a separate step unless additional magnetite or pigment is desired or needed.

Toner and developer compositions can be comprised of toner compositions containing resin particles obtained with the processes of the present invention, particularly styrene butadiene resins, pigment particles such as magnetites which also function as a stabilizer, optional polymeric hydroxy waxes available from Petrolite as detailed hereinafter, which waxes can be incorporated into the toner compositions as internal additives or may be present as external components; and optional charge enhancing additives, particularly, for example, distearyl dimethyl ammonium methyl sulfate, reference U.S. Pat. No. 4,560,635, the disclosure of which is totally incorporated herein by reference, and carrier particles. As carrier components for the aforementioned compositions, there can be selected steel or ferrite materials, particularly with a polymeric coating thereover including the coatings as illustrated in U.S. Ser. No. 751,922 (now abandoned) entitled Developer Composition with Specific Carrier Particles, the disclosure of which is totally incorporated herein by reference. One particularly preferred coating illustrated in the aforementioned application is comprised of a copolymer of vinyl chloride and trifluorochloroethylene with conductive substances dispersed in the polymeric coating inclusive of, for example, carbon black. Also, the developer composition can be comprised of styrene butadiene copolymer resin particles, magnetite, and charge enhancing additives selected from the group consisting of alkyl pyridinium halides, ammonium sulfates, and organic sulfate or sulfonate compositions; and carrier particles comprised of a core with a coating of vinyl copolymers, or vinyl homopolymers.

Numerous well known suitable pigments can be included as further colorant for the toner particles including, for example, carbon black such as Regal 330 ®, nigrosine dye, aniline blue, phthalocyanine derivatives, magnetites and mixtures thereof. This pigment, when added, can be present in amounts of from about 2 percent by weight to about 20 percent by weight, and preferably from about 3 to about 12 weight percent based on the total weight of the toner composition.

The known iron oxides or magnetites, include those commercially available as Mapico Black, and the like, reference the Reissue patent mentioned herein, which iron oxides can be present in the toner composition in an amount of from about 10 percent by weight to about 70 percent by weight, and preferably in an amount of from about 10 percent by weight to about 35 percent by weight. These oxides, such as magnetite, are usually added during the process of the present invention.

Also embraced within the scope of the present invention are colored toner compositions containing as pigments or colorants red, green blue, brown, magenta, cyan, and/or yellow particles, as well as mixtures thereof. More specifically, with regard to the generation of color images utilizing the toner and developer compositions of the present invention, illustrative examples of magenta materials that may be selected include, for example, 2,9-dimethyl-substituted quinacridone and anthraquinone dye identified in the Color Index as CI 60710, CI Dispersed Red 15, a diazo dye identified in the Color Index as CI 26050, CI Solvent Red 10, Lithol Scarlett, Hostaperm, and the like. Illustrative examples of cyan materials that may be used as pigments include copper tetra-4-(octadecyl sulfonamido)phthalocyanine, X-copper phthalocyanine pigment listed in the Color Index as CI 74160, CI Pigment Blue, and Anthrathrene Blue, identified in the Color Index as CI 69810, Special Blue X-2137, Sudan Blue, and the like; while illustrative examples of yellow pigments that may be selected include diarylide yellow 3,3-dichlorobenzidene acetoacetanilides, a monazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. These pigments are generally present in the toner composition in an amount of from about 2 weight percent to about 15 weight percent based on the weight of the toner resin particles. These pigments can be added during the preparation of the toner, however, in embodiments of the present invention it is believed that a number of the colored pigments may also function as a stabilizer similar to the magnetite. In these instances, the colored pigment can be added during the polymer formation process in place of the magnetite or iron oxide.

Illustrative examples of optional charge enhancing additives present in the toner in various effective amounts, such as, for example, from about 0.1 to about 20 percent by weight, include alkyl pyridinium halides, such as cetyl pyridinium chlorides, reference U.S. Pat. No. 4,298,672, the disclosure of which is totally incorporated herein by reference, cetyl pyridinium tetrafluoroborates, quaternary ammonium sulfate, and sulfonate charge control agents as illustrated in U.S. Pat. No. 4,338,390, the disclosure of which is totally incorporated herein by reference; stearyl phenethyl dimethyl ammonium tosylates, reference U.S. Pat. No. 4,338,390, the disclosure of which is totally incorporated herein by reference; distearyl dimethyl ammonium methyl sulfate, reference U.S. Pat. No. 4,560,635, the disclosure of which is totally incorporated herein by reference; stearyl dimethyl hydrogen ammonium tosylate; bisulfates, reference U.S. Pat. No. 4,904,762, the disclosure of which is totally incorporated herein by reference; mixtures thereof; and other known similar charge enhancing additives and the like.

With further respect to the toner and developer compositions of the present invention, a further component that can be present therein is a linear polymeric alcohol comprised of a fully saturated hydrocarbon backbone with at least about 80 percent of the polymeric chains terminated at one chain end with a hydroxyl group, which alcohol is represented by the following formula:

$$CH_3(CH_2)_nCH_2OH$$

wherein n is a number of from about 30 to about 300, and preferably of from about 30 to about 100, which alcohols are available from Petrolite Corporation. Particularly preferred polymeric alcohols include those wherein n represents a number of from about 30 to about 50. Therefore, in an embodiment of the present invention the polymeric alcohols selected have a number average molecular weight as determined by gas chromatography of from about greater than 450 to about 1,400, and preferably of from about 475 to about 750. In addition, the aforementioned polymeric alcohols can be present in the toner and developer compositions illustrated herein in various effective amounts, and can be added as uniformly dispersed internal, or as finely divided uniformly dispersed external additives. More specifically, the polymeric alcohols are present in an amount of from about 0.05 percent to about 20 percent by weight. Therefore, for example, as internal additives the polymeric alcohols can be present in an amount of from about 0.5 percent by weight to about 20 percent by weight, while as external additives the polymeric alcohols can be present in an amount of from about 0.05 percent by weight to slightly less than about 5 percent by weight. Toner and developer compositions with the waxes present internally are formulated by initially blending the toner resin particles, pigment particles, and polymeric alcohols, and other optional components. In contrast, when the polymeric alcohols are present as external additives, the toner composition is initially formulated comprised of, for example, resin particles and pigment particles; and subsequently there are added thereto finely divided polymeric alcohols.

Illustrative examples of carrier particles that can be selected for mixing with the toner compositions of the present invention include those particles that are capable of triboelectrically obtaining a charge of opposite polarity to that of the toner particles. Accordingly, the carrier particles of the present invention can be selected so as to be of a negative polarity thereby enabling the toner particles which are positively charged to adhere to and surround the carrier particles. Alternatively, there can be selected carrier particles with a positive polarity enabling toner compositions with a negative polarity. Illustrative examples of carrier particles that may be selected include granular zircon, granular silicon, glass, steel, nickel, iron, ferrites, silicon dioxide, and the like. Additionally, there can be selected as carrier particles nickel berry carriers as disclosed in U.S. Pat. No. 3,847,604, which carriers are comprised of nodular carrier beads of nickel characterized by surfaces of reoccurring recesses and protrusions thereby providing particles with a relatively large external area. Preferred carrier particles selected for the present invention are comprised of a magnetic, such as steel, core with a polymeric coating thereover several of which are illustrated, for example, in U.S. Ser. No. 751,922 (now abandoned) relating to developer compositions with certain carrier particles, the disclosure of which is totally incorporated herein by reference. More specifically, there are illustrated in the aforementioned application carrier particles comprised of a core with a coating thereover of vinyl polymers or vinyl homopolymers. Examples of specific carriers illustrated in this abandoned application, and useful for the present invention are those comprised of a steel or ferrite core with a coating thereover of a vinyl chloride/trifluorochloroethylene copolymer, which coating contains therein conductive particles, such as carbon black. Other coatings include fluoropolymers, such as polyvinylidene-fluoride resins, poly(chlorotrifluoroethylene), fluorinated ethylene and propylene copolymers, terpolymers of styrene, methylmethacrylate, and a silane, such as triethoxy silane, reference U.S. Pat. Nos. 3,467,634 and 3,526,533, the disclosures of which are totally incorporated herein by reference; polytetrafluoroethylene, fluorine containing polyacrylates, and polymethacrylates; copolymers of vinyl chloride; and trichlorofluoroethylene; and other known coatings. There can also be selected as carriers components comprised of a core with a polymer mixture coating thereover, reference U.S. Pat. Nos. 4,937,166 and 4,935,326, the disclosures of which are totally incorporated herein by reference. More specifically, there are detailed in these patents carrier particles with polymeric coating mixtures not in close proximity in the triboelectric series, and a process for the preparation of carrier particles with substantially stable conductivity parameters, which comprises (1) mixing carrier cores with a polymer mixture comprising from about 10 to about 90 percent by weight of a first polymer, and from about 90 to about 10 percent by weight of a second polymer; (2) dry mixing the carrier core particles and the polymer mixture for a sufficient period of time enabling the polymer mixture to adhere to the carrier core particles; (3) heating the mixture of carrier core particles and polymer mixture to a temperature of between about 200° F. and about 550° F. whereby the polymer mixture melts and fuses to the carrier core particles; and (4) thereafter cooling the resulting coated carrier particles.

Also, while the diameter of the carrier particles can vary, generally they are of a diameter of from about 50 microns to about 1,000 microns, thus allowing these particles to possess sufficient density and inertia to avoid adherence to the electrostatic images during the development process. The carrier particles can be mixed with the toner particles in various suitable combinations, however, from about 1 to about 5 parts per toner to about 10 parts to about 200 parts by weight of carrier can be mixed.

The toner compositions of the present invention can be prepared by a number of known methods, including mechanical blending and melt blending the toner resin particles, pigment particles or colorants, and polymeric alcohols followed by mechanical attrition which includes jetting and classification to enable toner particles with an average diameter of from about 10 to about 20 microns. Other methods include those well known in the art, such as spray drying, mechanical dispersion, melt dispersion, dispersion polymerization, extrusion, and suspension polymerization. In one dispersion polymerization method, a solvent dispersion of the resin particles, the stabilizer pigment particles, polymeric alcohols, and charge enhancing additive are spray dried under controlled conditions to result in the desired product. With further respect to the present invention, the polymeric alcohols are preferably added as external additives, that is the toner compositions are first prepared, which compositions are comprised of, for example, resin particles and pigment particles; and subsequently there is added thereto the polymeric alcohol, preferably in a finely divided form wax. Alternatively, however, as indicated herein the wax may be incorporated as an internal additive by formulating the toner composition with a process that comprises the mixing and melt blending of resin particles, pigment particles, and wax. The toner particles obtained can be subjected to known micronization to enable toners with an average particle diameter of from about 10 to about 30, and preferably from about 10 to about 20 microns.

The toner and developer compositions of the present invention may be selected for use in developing images in electrostatographic imaging systems, containing therein, for example, conventional photoreceptors, such as selenium and selenium alloys. Also useful, especially wherein there are selected positively charged toner compositions, are layered photoresponsive devices comprised of transport layers and photogenerating layers, reference U.S. Pat. Nos. 4,265,990; 4,585,884; 4,584,253 and 4,563,408, the disclosures of which are totally incorporated herein by reference, and other similar layered photoresponsive devices. Examples of photogenerating layers include selenium, selenium alloys, trigonal selenium, metal phthalocyanines, metal free phthalocyanines and vanadyl phthalocyanines, while examples of charge transport layers include the aryl amines as disclosed in U.S. Pat. No. 4,265,990. Moreover, there can be selected as photoconductors hydrogenated amorphous silicon; and as photogenerating pigments squaraines, titanyl phthalocyanines, perylenes; and the like.

Moreover, the toner and developer compositions of the present invention are particularly useful with electrostatographic imaging apparatuses containing a development zone situated between a charge transporting means and a metering charging means, which apparatus is illustrated in U.S. Pat. Nos. 4,394,429 and 4,368,970, the disclosures of which are totally incorporated herein by reference. More specifically, there is illustrated in the aforementioned '429 patent a self-agitated, two-component, insulative development process and apparatus wherein toner is made continuously available immediately adjacent to a flexible deflected imaging surface, and toner particles transfer from one layer of carrier particles to another layer of carrier particles in a development zone. In one embodiment, this is accomplished by bringing a transporting member, such as a development roller, and a tensioned deflected flexible imaging member into close proximity, that is a distance of from about 0.05 millimeter to about 1.5 millimeters, and preferably from about 0.4 millimeter to about 1.0 millimeter in the present of a high electric field, and causing such members to move at relative speeds. There is illustrated in the aforementioned '970 patent an electrostatographic imaging apparatus comprised of an imaging means, a charging means, an exposure means, a development means, and a fixing means, the improvement residing in the development means comprising in operative relationship a tensioned deflected flexible imaging means, a transporting means, a development zone situated between the imaging means and the transporting means; the development zone containing therein electrically insulating magnetic carrier particles, means for causing the flexible imaging means to move at a speed of from about 5 centimeters/second to about 50 centimeters/second, means for causing the transporting means to move at a speed of from about 6 centimeters/second to about 100 centimeters/second, the means for imaging and the means for transporting moving at different speeds; and the means for imaging and the means for transporting having a distance therebetween of from about 0.05 millimeter to about 1.5 millimeters.

A preferred developer composition obtained with the processes of the present invention in an embodiment thereof is comprised of a toner composition with styrene butadiene resin particles (91/9), about 16 percent by weight of magnetite, about 3 percent by weight of carbon black, about 1.0 percent by weight of the charge enhancing additive distearyl dimethyl ammonium methyl sulfate, and as an external additive about 0.30 percent by weight of the polymeric alcohol illustrated herein with a number average molecular weight of about 700, and carrier particles comprised of a steel core with a coating thereover of a polymer of, for example, a vinyl chloride/trifluorochloroethylene copolymer available as FPC 461, which coating has dispersed therein carbon black particles.

The following examples are being submitted to further define various species of the present invention. These examples are intended to illustrate and not limit the scope of the present invention. Also, parts and percentages are by weight unless otherwise indicated. Also, comparative examples are presented.

EXAMPLE I

There was prepared a styrene butadiene copolymer with the following apparatus and components:

600 milliliter Parr Reactor from Parr Instrument Company, 300 milliliter stainless steel pressure bomb, automatic temperature controller, and a heating mantle; 99 grams of styrene, 14.5 grams of 1,3 butadiene, 4.04 grams of 78 percent benzoyl peroxide (22 percent water), 0.52 gram of TBEC (O,O-t-butyl-O-(2-ethylhexyl)-monoperoxy-carbonate), 9.2 grams of Mapico Black magnetite obtained from Columbian Chemicals as Pigment Black 11, 0.246 gram of sodium nitrite, and 246 grams of deionized water.

The magnetite and sodium nitrite were added to the deionized water and then agitated and heated to 95° C. in the 600 milliliter Parr reactor. An agitation speed of about 408 was selected for the reaction. The 300 milliliter pressure bomb was connected to the Parr reactor by a ⅛ inch inside diameter tube. The styrene, butadiene, benzoyl peroxide, and TBEC were mixed together in the 300 milliliter bomb, and thereafter the resulting mixture was injected through the tube over a 5 minute period into the heated aqueous phase using 100 psi nitrogen pressure. The pressure in the Parr reactor was allowed to increase to 85 psi upon completion of monomer injection. After completion of the monomer mixture injection the reactor components were heated to 95° C. for 195 minutes, then to 125° C. over 40 minutes, and maintained at 125° C. for 60 minutes. The reactor was then allowed to air cool until the temperature was below 40° C. The styrene butadiene copolymer (89/11) product was then filtered in a filter funnel and washed with 500 milliliters of water three times for the primary purpose of removing sodium nitrite. The final product was comprised of styrene butadiene beads with a continuous coating of magnetite bound to the surface of each polymer bead. Upon analysis by TEM (Transmission Electron Microscopy), the thickness of the magnetite coating was estimated to be 0.5 micrometer. The molecular weight ($M_w$) of the polymer (89/11) product was 113,900 and the number average molecular weight ($M_n$) was 15,900 as determined by Gel Permeation Chromatography.

EXAMPLE II

The process of Example I was repeated with the same formulations and apparatus. The agitator speed was approximately 412 rpm. The styrene butadiene copolymer (89/11) product was filtered and washed with water. The final product was comprised of styrene butadiene beads (89/11) with a coating of magnetite bound to the surface of each bead. The molecular weight ($M_w$) of the product was 99,000 and the number average molecular weight ($M_n$) was 18,500 as determined by Gel Permeation Chromatography.

EXAMPLE III

There was prepared a styrene n-butyl methacrylate copolymer (58/42) with the following apparatus and components:

1 liter glass reactor equipped with a condenser and baffle, 500 milliliter addition funnel, stainless steel propeller agitator and shaft with variable speed agitator motor, temperature indicator and a heating mantle; 184.2 grams of styrene, 133.4 grams of n-butyl methacrylate, 5.3 grams of 78 percent benzoyl peroxide, 21.2 grams of Mapico Black magnetite obtained from Columbian Chemicals as Pigment Black 11, 0.033 gram of Alkanol ® (isopropyl) obtained from E. I. DuPont for all the Examples, and 413 grams of deionized water.

The magnetite Alkanol ® and deionized water were added into the reactor and agitated at approximately 500 rpm, and heated to 90° C. The styrene, n-butyl methacrylate and benzoyl peroxide were mixed together and added into the addition funnel. Over a ten minute period the monomers were transferred into the reactor using a gravity feed from the addition funnel. After completion of the above-mentioned monomer addition, the contents of the reactor were heated to 90° C. for 120 minutes, then heated to 96° C. over 30 minutes, maintained at 96° C. for 60 minutes, then air cooled to 40° C. The styrene n-butylmethacrylate product was then filtered in a filter funnel and washed three times with 500 milliliters of water to remove any remaining Alkanol ®. The beads had a black color due to the presence of magnetite. When a 10 gram sample was washed with an excess of hydrochloric acid, the magnetite was dissolved, thus revealing white spherical polymer beads. Examination of the acid washed beads by SEM (Scanning Electron Microscopy) showed that the surface of them was pitted thus indicating that the magnetite had been embedded in the surface of the polymer beads. This observation was confirmed by a TEM (Transmission Electron Microscopy) analysis of the water washed product. The TEM showed that the final product was comprised of polymer beads with a coating of magnetite bound to the surface of each bead. The thickness of the coating was estimated to be about 0.5 micrometer. The molecular weight ($M_w$) of the above product was 65,200 and the number average molecular weight ($M_n$) was 26,200 as determined by Gel Permeation Chromatography.

EXAMPLE IV

There was prepared a styrene n-butyl methacrylate copolymer (58/42) with the following apparatus and components:

5 gallon stainless steel jacketed Chemineer reactor, 15 liter pressure vessel, automatic temperature control system; 3,700 grams of styrene, 2,670 grams of n-butyl methacrylate, 105.8 grams of 78 percent benzoyl peroxide (22 percent water), 1,320 grams of Mapico Black magnetite obtained from Columbian Chemicals as Pigment Black 11, 0.826 gram of Alkanol ®, and 8,260 grams of deionized water.

The magnetite Alkanol ® and deionized water were added into the reactor and agitated at approximately 500 rpm, and heated to 90° C. The styrene, n-butyl methacrylate and benzoyl peroxide were mixed together and added into the 15 liter pressure vessel. Over a ten minute period the monomers were transferred into the reactor using 40 psi nitrogen pressure from the pressure vessel. At the end of the 10 minute addition, the reactor was allowed to pressurize with nitrogen to about 35 psi. After completion of the above-mentioned monomer addition, the contents of the reactor were heated to 90° C. for 120 minutes, then heated to 96° C. over 30 minutes, and maintained at 96° C. for 60 minutes, then cooled to about 45° C. over 60 minutes. The styrene n-butylmethacrylate product was then filtered and washed in a filter funnel. The final product was comprised of styrene n-butylmethacrylate beads with a continuous coating of magnetite bound to the surface of each bead. The TEM showed that the final product was comprised of polymer beads with a coating of magnetite bound to the surface of each bead. The thickness of the coating was estimated to be about 1.0 micrometer. The molecular weight ($M_w$) of the product was 65,100 and the number average molecular ($M_n$) weight was 31,400 as determined by Gel Permeation Chromatography.

Other modifications of the present invention may occur to those skilled in the art subsequent to a review of the present application, and these modifications are intended to be included within the scope of the present invention.

What is claimed is:

1. Processes for the preparation of polymers which comprises a suspension free radical polymerization of a monomer phase comprised of at least two monomers, and a polymerization initiator; and an aqueous phase comprised of water and magnetite, and wherein the magnetite functions as a stabilizer and a pigment.

2. Processes for the preparation of polymers which comprises a suspension free radical polymerization of a monomer phase comprised of at least two monomers, and a polymerization initiator; and an aqueous phase comprised of water, magnetite, and a alkali metal nitrate; and wherein the magnetite functions as a stabilizer and a pigment.

3. A process in accordance with claim 2 wherein the nitrite is sodium nitrite.

4. An absent free tricalcium phosphate suspension stabilizing process for the preparation of polymers which comprises a suspension free radical polymerization of a monomer phase comprised of styrene and butadiene, and a polymerization initiator; and an aqueous phase comprised of water and magnetite; and wherein the magnetite functions as a stabilizer and a pigment.

5. A process in accordance with claim 4 wherein the aqueous phase is comprised of water, magnetite, and an alkali metal nitrite.

6. A process for the preparation of polymers which comprises a suspension free radical polymerization of a monomer phase comprised of styrene and n-butyl methacrylate, and a polymerization initiator; and an aqueous phase comprised of water, magnetite, and an alkali metal nitrite.

7. An absent free tricalcium phosphate suspension stabilizing process for the preparation of polymers which comprises a suspension free radical polymerization of a monomer phase comprised of a mixture of monomers, and a polymerization initiator; and an aqueous phase comprised of water, magnetite, and surfactant; and wherein the magnetite functions as a stabilizer and a pigment.

8. A process in accordance with claim 7 wherein the aqueous phase is comprised of water, magnetite, surfactant, and an alkali metal nitrite.

9. A process in accordance with claim 4 wherein the aqueous phase is comprised of water, magnetite, and surfactant.

10. A process in accordance with claim 4 wherein the aqueous phase is comprised of water, magnetite, surfactant, and an alkali metal nitrite.

11. A process in accordance with claim 2 wherein a mixture of initiators is selected.

12. A process in accordance with claim 11 wherein one of the initiators is O,O-t-amyl-O-(2-ethylhexyl)-monoperoxy carbonate.

13. A process in accordance with claim 1 wherein the monomers are comprised of styrene and butadiene.

14. A process in accordance with claim 1 wherein from 2 to about 10 monomers are selected.

15. A process in accordance with claim 1 wherein a styrene butadiene toner polymer is obtained.

16. A process in accordance with claim 1 wherein there is selected for the monomer phase the surfactant component sodium alkyl naphthalene sulfonate.

17. A process in accordance with claim 1 wherein the polymerization of the monomers is accomplished by heating at a temperature of from about 95° to about 125° C.

18. A process in accordance with claim 2 wherein the polymerization is accomplished by heating at a temperature of from about 95° to about 125° C.

19. A process in accordance with claim 4 wherein the polymerization of the monomers is accomplished by heating at a temperature of from about 95° to about 125° C.

20. A process for preparing styrene butadiene copolymers which comprises mixing styrene monomer, butadiene monomer, first and second initiators; adding the mixture formed to an aqueous phase comprised of water and a surfactant; heating the resulting mixture for a period of from about 1 minute to about 2 hours at a temperature of from about 50° C. to about 110° C. to accomplish partial polymerization; thereafter adding thereto an additional aqueous phase comprised of water and magnetite, and subsequently continuing the polymerization for a period of from about 1 hour to about 15 hours; heating the resulting mixture at a temperature of from about 110° C. to about 150° C., and cooling the mixture; subsequently isolating the resulting styrene butadiene copolymer with a weight average molecular weight of between about 10,000 and 500,000, a molecular weight distribution of between about 2 and about 9, a Tg of between about 45° C. and about 75° C., the ratio of said styrene monomer and said butadiene monomer being between about 80:20 and about 95:5 by weight; and wherein the magnetite functions as a stabilizer and a pigment.

21. A process for the preparation of a polymer which comprises forming an aqueous phase comprised of water, magnetite pigment stabilizer, and a surfactant; adding to the aqueous phase two monomers; subsequently initiating polymerization of the monomers; and completing the polymerization by heating; and wherein the magnetite functions as a stabilizer and a pigment.

22. An absent free tricalcium phosphate suspension polymerization process for generating a copolymer of styrene and butadiene comprising providing an aqueous phase comprising water, magnetite, and surfactant and reacting with a monomer phase of styrene, butadiene and initiators, wherein the ratio of styrene monomer and butadiene monomer is being between about 80:20 and about 95:5 by weight, the weight proportion of water to the combination of said styrene monomer and said butadiene monomer is between about 0.8:1 and about 2:1; heating the aqueous phase and the formed vapor phase to a temperature between about 50° C. and about 130° C. at a pressure between about 20 psi and about 140 psi in the absence of redox initiators and mercaptan compounds; removing butadiene monomer from said vapor phase after at least about 75 percent by weight of said butadiene monomer and said styrene monomer are converted to a copolymer and prior to conversion of more than about 98 percent by weight of said butadiene monomer and said styrene monomer to a copolymer; and heating at a temperature between about 100° C. and about 130° C. at a pressure between about 20 psi and about 140 psi until at least about 90 percent by weight of said styrene monomer and said butadiene monomer are copolymerized to form an aqueous suspension of discrete copolymer particles having a Tg value of between about 45° C. and about 65° C., a weight average molecular weight of between about 10,000 and about 400,000, a molecular weight distribution of said copolymer being between about 2 and about 9 and a butadiene monomer concentration of less than about 10 parts per million by weight; and wherein the magnetite functions as a pigment and as a stabilizer.

23. A process in accordance with claim 22 wherein a second initiator is utilized.

24. A process in accordance with claim 22 wherein the aqueous mixture is agitated while heating.

25. A process in accordance with claim 22 wherein there is removed sufficient butadiene monomer from the vapor phase to reduce the butadiene monomer in said vapor phase to less than about 0.05 percent by volume.

26. A process in accordance with claim 22 wherein there is removed said butadiene monomer from said vapor phase by venting.

27. A process in accordance with claim 22 wherein there is removed said butadiene monomer from said vapor phase by increasing the pressure and venting.

28. A process in accordance with claim 22 wherein the initiator O,O-t-amyl-O-(2-ethylhexyl)monoperoxy carbonate is present in an amount of from about 0.12 percent to about 0.60 percent by weight relative to the weight of the monomers styrene and a second monomer of 1,3-butadiene.

29. A process according to claim 22 wherein the process is accomplished in a reactor which is flushed with an inert gas to remove oxygen.

30. A process in accordance with claim 1 wherein the water to monomer ratio is from about 0.8:1 to about 2:1.

31. A process in accordance with claim 1 wherein the water to monomer ratio is from about 1:1 to about 1.2:1.

32. A process in accordance with claim 2 wherein the water to monomer ratio is from about 0.8:1 to about 2:1.

33. A process in accordance with claim 1 wherein the initiator selected for polymerization is present in an amount of from about 0.5 to about 10 weight percent.

34. A process in accordance with claim 2 wherein the initiator selected for polymerization is present in an amount of from about 0.5 to about 10 weight percent.

35. A process in accordance with claim 1 wherein the initiator selected for polymerization is present in an amount of from about 1.5 to about 4 weight percent.

36. A process in accordance with claim 3 wherein the initiator selected for polymerization is present in an amount of from about 1.5 to about 4 weight percent.

37. A process in accordance with claim 3 wherein the magnetite is present in an amount of from about 1 to about 35 weight percent.

38. A process in accordance with claim 4 wherein the magnetite is present in an amount of from about 1 to about 35 weight percent of the monomers.

39. A process in accordance with claim 4 wherein the magnetite is present in an amount of from about 5 to about 20 weight percent of the monomers.

40. A process in accordance with claim 3 wherein the magnetite is present as a continuous coating on the polymer.

41. A process in accordance with claim 4 wherein the magnetite is present as a continuous coating on the polymer.

42. A process in accordance with claim 3 wherein the magnetite is present as a coating on the polymer in a thickness of from between about 0.1 to about 3 microns.

43. A process in accordance with claim 3 wherein the magnetite is present as a coating on the polymer in a thickness of from between about 0.5 to about 1 micron.

44. A process in accordance with claim 6 wherein the alkali metal nitrite is potassium nitrite.

45. A process in accordance with claim 6 wherein the alkali metal nitrite is sodium nitrite.

46. A process in accordance with claim 6 wherein the alkali metal nitrite is present in an amount of from about 800 ppm to about 1,200 ppm.

47. A process in accordance with claim 46 wherein the alkali metal nitrite is potassium nitrite present in an amount of from about 800 ppm to about 1,200 ppm.

48. A process in accordance with claim 46 wherein the alkali metal nitrite is sodium nitrite present in an amount of from about 800 ppm to about 1,200 ppm.

49. A process in accordance with claim 7 wherein the surfactant is present in water in an amount of from about 20 ppm to about 600 ppm.

50. A process in accordance with claim 7 wherein the surfactant is present in water in an amount of from about 100 ppm to about 400 ppm.

51. A process in accordance with claim 2 wherein two monomers are selected for the monomer phase.

52. A process in accordance with claim 2 wherein two monomers are selected.

53. A process in accordance with claim 7 wherein two monomers are selected.

54. A process in accordance with claim 8 wherein two monomers are selected.

55. A process in accordance with claim 20 wherein the said additional aqueous phase comprised of water and magnetite contains an alkali metal nitrite.

56. A process in accordance with claim 22 wherein the aqueous phase contains an alkali metal nitrite.

57. A process in accordance with claim 20 wherein the aqueous phase comprised of water and magnetite contains an alkali metal nitrite comprised of sodium nitrite.

58. A process in accordance with claim 22 wherein the aqueous phase containing an alkali metal nitrite is comprised of sodium nitrite.

59. A process in accordance with claim 1 wherein the magnetite is present on each polymer formed as a continuous coating and has a thickness of 0.5 micron.

* * * * *